(12) United States Patent
Jakob et al.

(10) Patent No.: US 6,275,386 B1
(45) Date of Patent: Aug. 14, 2001

(54) CABINET WITH AT LEAST ONE BUILT-IN ELECTRICAL APPARATUS

(75) Inventors: Jürgen Jakob; Thomas Schüppler, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,294

(22) PCT Filed: Apr. 16, 1999

(86) PCT No.: PCT/DE99/01213

§ 371 Date: Apr. 19, 2000

§ 102(e) Date: Apr. 19, 2000

(87) PCT Pub. No.: WO99/55126

PCT Pub. Date: Oct. 28, 1999

(30) Foreign Application Priority Data

Apr. 17, 1998 (DE) .............................................. 198 17 945

(51) Int. Cl.[7] ...................................................... H05K 5/00
(52) U.S. Cl. ............................................. 361/752; 361/679
(58) Field of Search ..................................... 361/600, 610, 361/679, 724–727, 752, 690, 882

(56) References Cited

U.S. PATENT DOCUMENTS

| | | | |
|---|---|---|---|
| 1,848,837 | * 3/1932 | Powers | 361/610 |
| 2,130,250 | * 9/1938 | Reed | 361/610 |
| 4,964,018 | * 10/1990 | Mallory et al. | 361/725 |
| 5,214,572 | * 5/1993 | Cosimano et al. | 361/802 |
| 5,646,819 | * 7/1997 | Hill, III | 361/683 |
| 6,061,250 | * 5/2000 | Lavan | 361/797 |

* cited by examiner

*Primary Examiner*—Jayprakash N. Gandhi
*Assistant Examiner*—Phuong T. Vu
(74) *Attorney, Agent, or Firm*—Kenyon & Kenyon

(57) ABSTRACT

A cabinet is described with at least one installed electrical device has a front with a front panel with display and control elements and connecting leads from these elements into the interior of the electrical device, as well as a back with mechanisms for the attachment of electrical linking lines. In order to provide ready accessibility of the mechanisms for the attachment of electrical linking lines in such a cabinet through simple design techniques, the front panel of the electrical device is made removable, and the electrical device is mounted in the cabinet with the front panel removed and with the back forward. The front panel is held in the front region of the cabinet, and the appropriately long-dimensioned connecting leads are led through the front into the interior of the electrical device.

1 Claim, 1 Drawing Sheet

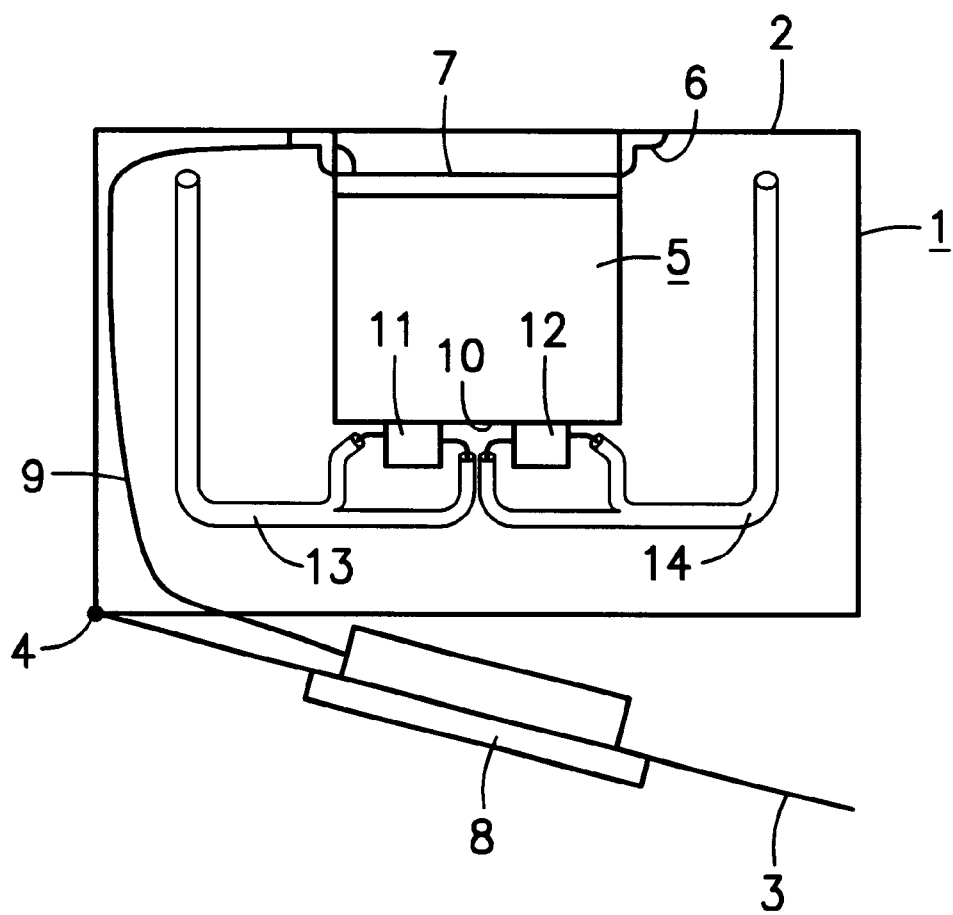

CABINET WITH AT LEAST ONE BUILT-IN ELECTRICAL APPARATUS

FIELD OF THE INVENTION

The present invention relates to a cabinet with at least one installed electrical device, which has a front with a front panel with display and control elements and connecting leads from these elements into the interior of the electrical device, as well as a back with mechanisms for the attachment of electrical linking lines.

BACKGROUND INFORMATION

A cabinet is illustrated and described on pages 2 to 4 of Siemens AG Catalog R1.1979, "Electronic Protective Devices." At least one so-called card cage is installed in this cabinet as the electrical device. The at least one card cage is installed in the cabinet by screwing it to perforated guiding plates of the cabinet. The card cage, as electrical device, has on its front one or more front panels bearing display and control elements. These display and control elements are connected in conventional fashion to the interior of the electrical device via electrical connecting leads. Mechanisms for the attachment of electrical linking lines are present on the back of the electrical device of the cabinet. The mechanisms for the attachment of electrical linking lines function, first, to connect the individual components of the electrical device to one another and, second, to bring linking lines to the outside. The cabinet has a cabinet door not only on its front but also on its back. The cabinet door on the back permits ready access to the mechanisms for the attachment of electrical linking lines. If the cabinet is provided for a particular application in which it is to be set up directly in front of a wall, the card cages are not screwed directly to the cabinet but to a pivoting frame, which permits the electrical device to be pivoted out of the cabinet. After pivoting out, the wiring on the back of the electrical device is readily accessible.

SUMMARY

It is an object of the present invention to develop a cabinet with at least one installed electrical device in such a way that the back of the electrical device is made readily accessible in a manner simple in terms of design.

In a cabinet of the type stated at the outset, this object is achieved according to the present invention by making the front panel of the electrical device removable and mounting the electrical device in the cabinet with the front panel removed and with the back forward. The front panel is held on the cabinet next to the electrical device, and the appropriately long-dimensioned connecting leads are led through the front into the interior of the electrical device.

One advantage of the cabinet according to the present invention is that the use of an electrical device with a removable front panel and appropriately long-dimensioned connecting leads from the front panel into the device interior and the mounting of the electrical device with the back forward result in optimal accessibility of the mechanisms for the attachment of electrical linking lines without the use of a pivoting frame or other costly design approaches. Given an appropriate arrangement of the removed front panel, both the front panel and the mechanism for the attachment of electrical linking lines are simultaneously readily accessible to the operating personnel.

In the cabinet according to the present invention, the front panel of the electrical device can be mounted in various ways. It is possible, for example, to hang or snap in the front panel on a side wall of the cabinet.

It may be advantageous if the front panel is held on a front door of the cabinet or integrated into the front door.

BRIEF DESCRIPTION OF THE DRAWING

The FIGURE shows a schematic of an example embodiment of a cabinet according to the present invention.

DETAILED DESCRIPTION

The FIGURE shows a cabinet 1, which has a back wall 2 and a front door 3 pivotable on a hinge 4.

On back wall 2 of cabinet 1, an electrical device 5 is mounted with brackets 6 in such a way that its front 7 faces back wall 2. Before electrical device 5 was mounted on back wall 2 of cabinet 1, a front panel 8 of electrical device 1 was removed from front 7. When device 5 is mounted in cabinet 1, connecting leads 9 between front panel 8 i.e., the display and control elements, and the interior of device 5 are routed by the side of electrical device 5.

As a consequence of the mounting of device 5 with its front 7 facing back wall 2 of cabinet 1, a back 10 of electrical device 5 faces cabinet door 3. Mechanisms 11 and 12 for the attachment of electrical linking lines 13 and 14 thus also face cabinet door 3 in cabinet 1, so that these mechanisms 11 and 12 are freely accessible once cabinet door 3 is opened. Thus, after cabinet door 3 is opened, it is easy to work on mechanisms 11 and 12.

What is claimed is:

1. A cabinet arrangement, comprising:
   a cabinet having a back portion, including mechanisms for attaching electrical linking lines, and a front side; and
   an electrical device including a front panel with display and control elements, and connecting leads extending from the display and control elements into an interior of the electrical device, the front panel of the electrical device being removable, the electrical device being mounted in the cabinet with the front panel removed and a back portion of the electrical device facing the front side of the cabinet, the front panel being held on the cabinet next to the electrical device, and the connecting leads being led through a front end of the electrical device into the interior of the electrical device wherein the front panel is held on a front door of the cabinet, the front door being attached to the front side of the cabinet.

* * * * *